Dec. 27, 1949     J. A. PORATH     2,492,765
SHOCK STRUT
Filed June 25, 1945
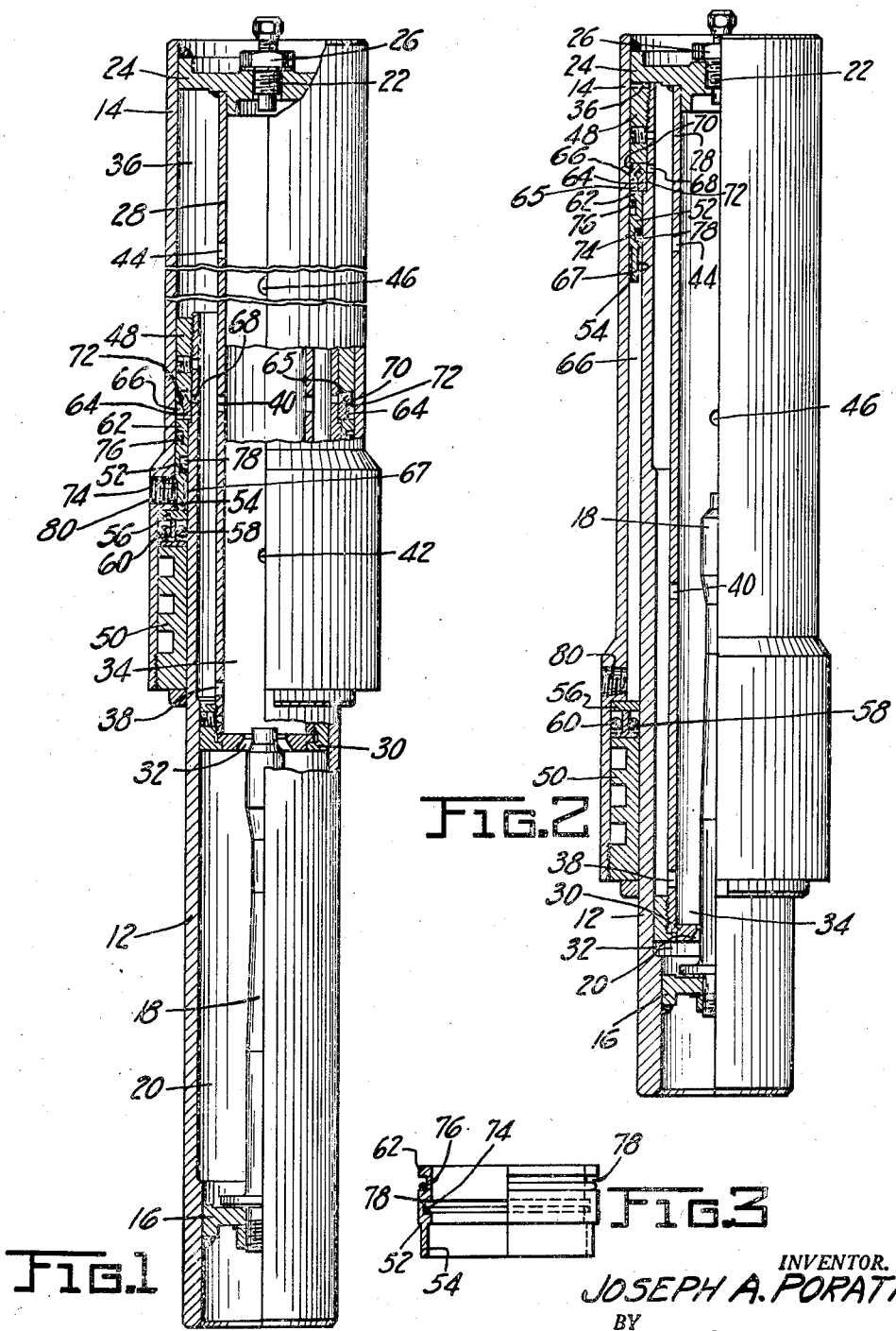
INVENTOR.
JOSEPH A. PORATH
BY
T. J. Plante
ATTORNEY Patented Dec. 27, 1949

2,492,765

UNITED STATES PATENT OFFICE 2,492,765

SHOCK STRUT

Joseph A. Porath, South Bend, Ind., assignor to Bendix Aviation Corporation, South Bend, Ind., a corporation of Delaware Application June 25, 1945, Serial No. 601,537

8 Claims. (Cl. 244—102)

The present invention relates to airplane landing gear, and particularly to the compressible shock absorbing portion thereof.

It has become the general practice to retract the landing gear into the body of the airplane after the plane has taken off, and to retain the landing gear in retracted position during flight in order to reduce wind resistance, and thereby improve the speed and fuel economy of airplane operation.

In some cases, the matter of landing gear retraction is complicated either by an excessively long landing gear, or by a lack of available space in the body of the plane into which the landing gear can be retracted. In view of this, it is highly desirable in many instances to provide means for shortening or reducing the length of the strut preparatory to retraction.

An object of the present invention is therefore to provide improved means for compressing or reducing the length of a shock strut after the plane is in flight, in order to simplify the retraction problem.

A further object of the present invention is to provide a strut which utilizes a minimum of additional parts and requires only very slight modification of conventional structures to obtain the advantage of compressibility prior to retraction, discussed in the preceding paragraph.

A still further object of the present invention is to provide an arrangement for collapsing or shortening a shock strut preparatory to retraction which arrangement is compatible with the conventional snubbing arrangement, even though the fluid under pressure required to shorten the strut is introduced into the same annular chamber between the upper and lower bearings which serves as a fundamental part of the conventional snubbing arrangement.

Other objects and advantages of the present invention will appear during the subsequent description of an embodiment of the invention, which for the purposes of the present application, has been illustrated in the accompanying drawing, in which:

Figure 1 is a vertical sectional view showing a shock strut incorporating my invention, the strut being in the extended position;

Figure 2 shows a vertical sectional view of the same strut after it has been shortened in the novel manner which forms the subject matter of my invention; and Figure 3 is a view showing the compressor adaptor which is of particular importance in permitting the strut to be shortened in accordance with the present invention.

Referring to the drawing, the shock strut in general comprises inner and outer telescoping cylindrical or tubular members 12 and 14, respectively. For the purposes of the invention, it is immaterial which of the tubular members constitutes the upper, and which the lower, portion of the strut. However, as illustrated, the outer member 14 constitutes the upper part of the strut and is adapted to be secured to the body of the airplane, whereas the inner tubular member 12 constitutes the lower portion of the strut and is adapted to support the ground contacting element of the plane, such as the wheel. The lower end of the inner telescoping element 12 is closed by means of a fixed wall 16, which carries thereon a metering pin 18, for a purpose which will hereinafter be described. The closed chamber 20 formed inside the inner telescoping member 12 is arranged to be filled with a suitable liquid, which constitutes an energy dissipating medium during the landing shock of the plane. The liquid may be admitted to the interior of the strut through an inlet 22 formed in a fixed wall 24 located at the top of the outer cylinder 14. The inlet 22 is also used for the admission of air under pressure to the strut, and a closure member 26 is provided for said inlet. The compressed air remains in the upper portion of the strut, and during operation of the strut serves as a compressible medium for storing energy, and for softening the bumps encountered during taxiing of the plane.

A tubular piston rod 28 is supported at the top of the outer cylindrical member 14, and has secured to its lower end a piston 30 which is provided with an orifice 32. When the airplane lands, the orifice 32 and the metering pin 18 cooperate to restrict the flow of liquid from chamber 20 to chambers 34 and 36 formed above the piston 30. The contour of the metering pin 18 is such as to vary the size of the orifice and thus control the resistance to flow of the liquid to thereby obtain the optimum conditions of energy dissipation during the landing stroke of the strut. In some instances a metering pin such as the pin 18 is not found necessary for the satisfactory operation of the strut, and accordingly the present invention is not necessarily limited to struts having metering pins, but is intended to be broadly applicable to all shock absorbing devices.

Free communication between chambers 34 and 36 is permitted by a plurality of openings, such as 38, 40, and 42. Also, in the upper part of the strut, free movement of compressed air between the upper extensions of said chambers 34 and 36 is permitted by such openings as 44 and 46.

Bearing contact between the inner and outer telescoping members 12 and 14 is provided at two places. A bearing member 48 is secured to the upper end of the inner telescoping member 12 and a bearing member 50 is secured to the lower end of the outer telescoping member 14. The only direct wall-to-wall contact between the inner and outer telescoping members is therefore through the upper and lower bearing members 48 and 50. Figure 1 illustrates the upper and lower bearings in the position in which they come closest to one another. It will be appreciated that this is the position of maximum bending moment. In other words, a given force exerted on the lower end of the strut tending to bend the same will exert a maximum binding effect through the bearings when they are located this closely to one another. It will be apparent therefore that, even in the fully extended position of the strut, a certain distance will usually have to be allowed between the upper and lower bearings in order to minimize the binding effect of external bending forces. The amount of space required between the bearings will of course depend upon the structural details of the airplane and strut.

At any rate, means will usually have to be provided to guarantee a certain spacing between the bearings when the strut is in fully extended position. In order to satisfy this requirement, although shoulders on the structural parts of the strut are sometimes provided, I prefer to use a separate spacer element.

In the drawing, the spacer element bears the number 52. This spacer, which is also referred to as a compressor adaptor, is annular in form, as shown most clearly in the Figure 3, which is a representation of this single element. The lower part 54 of the spacer is somewhat reduced in thickness, as shown, and is arranged to contact the upper washer 56 of the lower bearing 50, the washer 56 being assembled as a separate element of bearing 50 in order to permit the assembling of suitable seals 58 and 60, which prevent escape of fluid past bearing 50.

The upper end 62 of spacer 52 is in contact with an annular member 64 which serves as a control for the rebound snubbing of the strut motion, a function which will be more fully described hereinafter. The upper edge of member 64 is in direct contact with the lower edge of bearing 48, thus providing, in the fully extended position of the strut, a mechanical spacing means for holding apart the upper and lower bearings, the spacing means, in effect, constituting both the spacer 52 and the member 64. However, it is possible to dispense with the member 64 and duplicate the function thereof by other means. Therefore the present invention is not concerned with the particular type of device which is used to obtain the rebound snubbing effect.

The purpose of member 64 is, broadly speaking, to permit a relatively free flow of liquid from the interior of the shock strut into the upper part 65 of annular chamber 66 during the compression stroke of the strut and to restrict flow of liquid from chamber 66 into the interior of the strut during the rebound or extension stroke, thereby damping the reciprocation or oscillation which would otherwise be set up due to alternate increases and decreases of the pressure of the air in the strut. During the compression stroke of the strut, liquid flows from chamber 36 in the interior thereof through openings 68 and around the upper edge 70 of member 64 into chamber 66. On the rebound stroke, the pressure of liquid trying to escape from chamber 66 holds member 64 against bearing 48, and the escaping liquid is forced to move through the restricted openings provided by the two very small holes 72.

In order to provide means for compressing or shortening the strut prior to retraction of the landing gear, I propose to convert spacer 52 into a piston or driving element. This is done by providing a pressure tight seal 74 at the inner diameter of the spacer and a second pressure tight seal 76 at the outer diameter of the spacer. These seals may be of any suitable type, the round section seals being shown for purposes of illustration only. Each seal is located in a suitable groove 78 provided in the respective side of the spacer. The seals are, of course, annular in shape to extend around the circumference of the spacer.

An inlet 80 is provided in the lower end 67 of chamber 66, opposite the reduced thickness portion 54 of the spacer. The opening 80 is connected by suitable means to a source of liquid under pressure, such as the accumulator which is provided on most airplanes. Suitable means are provided under the control of the operator for controlling the inflow and outflow of pressure liquid through opening 80 to and from chamber 67. By admitting liquid under pressure to said chamber, the spacer 52, which then acts as a piston, can be forced upwardly to reduced the length of the strut after the plane is in the air.

The following is a brief summary of the operation of my improved mechanism. Assuming that the airplane is in the air but preparing to land, the shock strut will be in the extended position, as shown in Figure 1. When the plane contacts the ground, the upward movement of member 12 with respect to member 14, will force liquid from chamber 20 through the orifice 32, increasing the pressure of the compressed air in the upper part of the strut. The movement of liquid through the restricted opening 32 converts the kinetic energy of the landing plane into heat due to the frictional resistance to flow of the liquid. That portion of the energy which is not converted in this manner is temporarily stored in the compressed air in the upper part of the strut. In this connection, it will be apparent that the resilient medium in the strut need not necessarily be air, but may be a mechanical spring, or the like. When the pressure in the strut has been built up to the point where it equals the pressure tending to compress the strut, the compression stroke ceases and the rebound stroke begins. During the compression stroke, the liquid from the interior of the strut passes through ports 68 into the upper compartment 65 of chamber 66, member 64 being forced away from contact with bearing 48 to permit a relatively free flow of fluid into chamber 66, said chamber increasing in volume as the strut is compressed. The pressure of the liquid in chamber 65 will maintain spacer 52 in contact with lower bearing 56 during the compression stroke caused by landing of the plane. Therefore, during normal landing and taxiing operation spacer 52 remains in its lowest position against washer 56.

On the rebound stroke, the built up pressure of the compressed air causes a partial extension of the strut. During this stroke, the pressure of fluid in chamber 66 attempting to leave said chamber moves member 64 into contact with upper bearing 48, thereby preventing the escape of liquid from chamber 65 except through the small openings 72. This restriction of the flow of fluid causes a dissipation of energy during the recoil, or in other words, has a snubbing effect, which prevents undue continuance of the reciprocating motion, bringing the strut to a relatively stable position. During taxiing of the plane, the effect of bumps and irregularities on the ground will be softened or cushioned by the compressed air.

The strut remains in this partially compressed or shortened position so long as the airplane is on the ground. When the plane takes off, the removal of weight permits the strut to extend under the pressure stored in the compressed air. This extension will continue until the position of Figure 1 is reached, wherein the spacer 52 determines the distance between the upper and lower bearings.

The next step is to shorten the strut prior to retracting the landing gear into the body of the plane. This is accomplished by admitting liquid under pressure through inlet opening 80 into the lower end of chamber 66, below the seals 74 and 76. This pressure acts through the piston-spacer member 52 to reduce the length of the strut, bringing it eventually into the position shown in Figure 2. It will be appreciated that the amount by which the strut is shortened will depend upon the hydraulic pressure available and the air pressure resistance encountered. If desired, during the shortening of the strut by means of pressure acting through piston-spacer 52, the pressure of the air within the strut may be relieved somewhat by directing a portion of it to a suitable reservoir. However, this is not necessary. The inner cylinder will move upwardly until the air and hydraulic pressures balance or until a stop is reached, preferably the latter. When the strut has reached the shortened position shown in Figure 2, it is preferable that it be mechanically locked in position, to secure it against accidental extension which might result from a temporary reduction of the accumulator pressure.

The landing gear has now been reduced to its minimum overall length, and is ready to be retracted into the body of the plane by any suitable mechanism.

When the time comes to again land the plane, the landing gear is first returned from the retracted or substantially horizontal position to the vertical position, the lock holding the strut in shortened position is released, and the pressure acting in the lower end 67 of chamber 66 is also released, as by permitting the liquid to flow to a reservoir in the accumulator system. The pressure of the air in the strut, together with the weight of the ground contacting element, will now cause the strut to move to extended position, as shown in Figure 1, thereby completing the cycle of operation, and bringing the piston-spacer member 52 again into contact with the upper end of the lower bearing.

From the foregoing, it will be appreciated that means have been provided for safely shortening or compressing a shock strut prior to retraction, and that such means have been obtained with an absolute minimum of additional parts, the only added parts being, in effect, the seals 74 and 76, which serve to convert the spacer 52 into a piston, or, in other words, to give it an added function. The spacer is a necessary element in most shock struts. There is thus provided an integral shortening unit for the strut without adding a lot of extra parts or disturbing the other structural elements of the conventional strut. The length-reducing means is combined with the preferred and generally used snubbing arrangement wherein this function is accomplished by control of the flow of liquid from the annular chamber located between the bearings. The same chamber is, in effect, used for both purposes.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. For use in airplane landing gear, a shock strut comprising an outer cylinder adapted to be attached to the airplane body and having an inwardly directed bearing portion at its lower end, said outer cylinder having a compressible medium therein to minimize shocks, an inner cylinder adapted to carry a ground contacting element and telescopically arranged in said outer cylinder with an outwardly directed bearing portion at its upper end, said inner cylinder having liquid therein the restricted flow of which dissipates kinetic energy during the compression stroke, there being an annular chamber defined between the bearings of said inner and outer cylinders which enlarges as the strut compresses and becomes smaller as the strut extends, a piston member supported by the outer cylinder having a flow-restricting orifice therein and cooperating with the inner cylinder to displace liquid through said orifice during compression of the strut against increasing resistance of the compressible medium, rebound snubbing means arranged to admit fluid relatively freely to the aforementioned annular chamber during the compression stroke of the strut, but to allow only relatively restricted flow of fluid from said annular chamber during the rebound stroke of the strut, an annular spacer member located in said annular chamber and arranged to hold the upper and lower bearings a predetermined distance apart when the strut is fully extended, a seal for the inner diameter of said spacer, a second seal for the outer diameter of said spacer, said spacer with said seals constituting a piston, and a fluid inlet for said chamber adapted to deliver fluid under pressure to said chamber to move the spacer upwardly and thereby force the cylinder which carries the ground contacting element in a direction to shorten the strut prior to retraction of the same into the body of the plane.

2. For use in airplane landing gear, a shock strut comprising two telescoping members, one of which is adapted to be connected to the airplane body and has a bearing supporting thereon at its lower end, and the other of which is adapted to carry a ground contacting element and has a bearing supported thereon at its upper end, there being an annular chamber located between said bearings which enlarges as the strut compresses and becomes smaller as the strut extends, means in said strut for damping the compression stroke thereof and for cushioning impact shocks, rebound snubbing means arranged to admit fluid relatively freely to the aforementioned annular chamber during the compression stroke of the strut, but to allow only relatively restricted flow of fluid from said annular chamber during the rebound stroke of the strut, an annular spacer member located in said anular chamber and arranged to hold the upper and lower bearings a predetermined distance apart when the strut is fully extended, a seal for the inner diameter of said spacer, a second seal for the outer diameter of said spacer, said spacer with said seals constituting a piston, and a fluid inlet for said chamber adapted to deliver fluid under pressure to said chamber to move the spacer upwardly and thereby force the member which carries the ground contacting element in a direction to shorten the strut prior to retraction of the same into the body of the plane.

3. For use in airplane landing gear, a shock strut comprising two telescoping members, one of which is adapted to be connected to the airplane and has a bearing supported thereon at its lower end, and the other of which is adapted to carry a ground contacting element and has a bearing supported thereon at its upper end, there being an annular chamber located between said bearings which enlarges as the strut compresses and becomes smaller as the strut extends, means in said strut for damping the compression stroke thereof and for cushioning impact shocks, rebound snubbing means arranged to admit fluid relatively freely to the aforementioned annular chamber during the compression stroke of the strut, but to allow only relatively restricted flow of fluid from said annular chamber during the rebound stroke of the strut, and piston means in said chamber adapted to be moved upwardly by fluid under pressure to force the member which carries the ground contacting element in a direction to shorten the strut prior to retraction of the same into the airplane.

4. For use in airplane landing gear, a shock strut comprising two telescoping members, one of which is adapted to be connected to the airplane and has a bearing supported thereon at its lower end, and the other of which is adapted to carry a ground contacting element and has a bearing supported thereon at its upper end, there being an annular chamber located between said bearings which enlarges as the strut compresses and becomes smaller as the strut extends, an annular spacer member located in said annular chamber and arranged to hold the upper and lower bearings a predetermined distance apart when the strut is fully extended, a seal for the inner diameter of said spacer, a second seal for the outer diameter of said spacer, said spacer with said seals constituting a piston, and a fluid inlet for said chamber adapted to deliver fluid under pressure to said chamber to move the spacer upwardly and thereby force the member which carries the ground contacting element in a direction to shorten the strut prior to retraction of the same into the airplane.

5. For use in airplane landing gear, a shock strut comprising two telescoping members, one of which is adapted to be connected to the airplane and has a bearing supported thereon at its lower end, and the other of which is adapted to carry a ground contacting element and has a bearing supported thereon at its upper end, there being an annular chamber located between said bearings which enlarges as the strut compresses and becomes smaller as the strut extends, an annular spacer member located in said annular chamber and arranged to hold the upper and lower bearings a predetermined distance apart when the strut is fully extended, sealing means cooperating with said spacer to prevent flow of fluid past the spacer, thereby constituting the same a pressure responsive piston, and a fluid inlet for said chamber adapted to deliver fluid under pressure to said chamber to move the spacer upwardly and thereby force the member which carries the ground contacting element in a direction to shorten the strut prior to retraction of the same into the airplane.

6. For use in airplane landing gear having a shock strut which comprises two telescoping members, one of which is adapted to be connected to the airplane and has a bearing supported thereon at its lower end, and the other of which is adapted to carry a ground contacting element and has a bearing supported thereon at its upper end, there being an annular chamber located between said bearings which enlarges as the strut compresses and becomes smaller as the strut extends; an annular piston-spacer member located in said annular chamber which operatively engages the upper and lower bearings to hold them a predetermined distance apart when the strut is fully extended, and which has a pressure responsive portion adapted to be acted upon by fluid under pressure to shorten the strut prior to retraction.

7. For use in airplane landing gear having a shock strut which comprises two telescoping members, one of which is adapted to be connected to the airplane body and has a bearing supported thereon at its lower end, and the other of which is adapted to carry a ground contacting element and has a bearing supported thereon at its upper end, there being an annular chamber located between said bearings which enlarges as the strut compresses and becomes smaller as the strut extends; an annular spacer member located in said annular chamber and arranged to hold the upper and lower bearings a predetermined distance apart when the strut is fully extended, said spacer member having at least a portion thereof which fits said annular chamber closely and having circumferential grooves therein, one at its inner diameter, and one at its outer diameter, a seal located in the inner diameter groove of said spacer, a second seal located in the outer diameter groove of said spacer, said spacer with said seals constituting a piston, and a fluid inlet for said chamber adapted to deliver fluid under pressure to said chamber below said seals to move the spacer upwardly and thereby force the member which carries the ground contacting element in a direction to shorten the strut prior to retraction of the same into the body of the plane.

8. For use in airplane landing gear, a shock strut comprising two telescoping members, one of which is adapted to be connected to the airplane and has a bearing supported thereon at its lower end, and the other of which is adapted to carry the ground contacting element and has a bearing supported thereon at its upper end, there being an annular chamber located between said bearings which enlarges as the strut compresses and becomes smaller as the strut extends, and an annular piston which is located in said annular chamber and which is movable upwardly by fluid under pressure to force the member which carries the ground contacting element in a direction to shorten the strut prior to retraction of the same into the airplane.

JOSEPH A. PORATH.

REFERENCES CITED

The following references are of record in the file of this patent:

UNITED STATES PATENTS

| Number | Name | Date |
|---|---|---|
| 1,918,426 | Radnor | July 18, 1933 |
| 2,016,394 | Sikorsky | Oct. 8, 1935 |
| 2,107,494 | Onions et al. | Feb. 8, 1938 |
| 2,186,266 | Onions | Jan. 9, 1940 |
| 2,313,242 | Johnson | Mar. 9, 1943 |

Certificate of Correction

Patent No. 2,492,765 December 27, 1949

JOSEPH A. PORATH

It is hereby certified that errors appear in the printed specification of the above numbered patent requiring correction as follows:

Column 4, line 22, for the word "reduced" read *reduce*; column 6, line 54, for "supporting" read *supported*;

and that the said Letters Patent should be read with these corrections therein that the same may conform to the record of the case in the Patent Office.

Signed and sealed this 9th day of May, A. D. 1950.

[SEAL]

THOMAS F. MURPHY,
*Assistant Commissioner of Patents.*